(12) United States Patent
Skergan

(45) Date of Patent: Apr. 13, 2010

(10) Patent No.: US 7,696,979 B1

(54) METHOD AND SYSTEM FOR MANIPULATING A PLURALITY OF GRAPHICAL POINTERS

(75) Inventor: Timothy Michael Skergan, Austin, TX (US)

(73) Assignee: International Business Machines Coporation, Armonk, NY (US)

(*) Notice: Subject to any disclaimer, the term of this patent is extended or adjusted under 35 U.S.C. 154(b) by 0 days.

(21) Appl. No.: 08/353,008

(22) Filed: Dec. 9, 1994

(51) Int. Cl.
*G06F 3/033* (2006.01)
*G09G 5/08* (2006.01)

(52) U.S. Cl. ........................... 345/157; 715/754
(58) Field of Classification Search ............ 345/145, 345/119, 123, 146, 157, 159, 160, 204; 715/754, 715/711, 856
See application file for complete search history.

(56) References Cited

U.S. PATENT DOCUMENTS

| 4,535,365 A | 8/1985 | Sakamoto | |
|---|---|---|---|
| 4,725,830 A | 2/1988 | Kawai et al. | |
| 4,917,516 A * | 4/1990 | Retter | 345/163 |
| 4,933,514 A * | 6/1990 | Bowers | 345/163 |
| 4,975,690 A | 12/1990 | Torres | |
| 5,050,105 A | 9/1991 | Peters | |
| 5,091,866 A | 2/1992 | Takagi | |
| 5,204,947 A * | 4/1993 | Bernstein et al. | 345/146 |

FOREIGN PATENT DOCUMENTS

| DE | 4217417 | 12/1992 |
|---|---|---|
| EP | 281677 | 9/1988 |

OTHER PUBLICATIONS

Claris Corporation, MacDraw Pro User's Guide, pp. 1-24, 3-20, and 3-21. 1991.*
Apple Computer, Inc., Macintosh Notebook MacPaint, 1985.*

\* cited by examiner

*Primary Examiner*—Ricardo L Osorio
(74) *Attorney, Agent, or Firm*—Dillon & Yudell LLP (57) ABSTRACT

An improved method and system for manipulation a plurality of graphical pointers utilizing a single graphical pointing device are disclosed. A plurality of graphical pointers are displayed within a display device. A user may then temporarily select one graphical pointer among the plurality of graphical pointers. During the selection, the selected graphical pointer is manipulated in response to operation of a single graphical pointing device. A point within the display device specified by the position of the selected graphical pointer is selected in response to closure of a switch associated with the selected graphical pointer.

20 Claims, 7 Drawing Sheets

METHOD AND SYSTEM FOR MANIPULATING A PLURALITY OF GRAPHICAL POINTERS

BACKGROUND OF THE INVENTION

1. Technical Field

The present invention relates in general to an improved method and system for data processing, and in particular to and improved method and system of user interface to a data processing system. Still more particularly, the present invention relates to an improved method and system within a data processing system for manipulating a plurality of graphical pointers utilizing a single graphical pointing device.

2. Description of the Related Art

Within data processing systems, user interface is accomplished in a variety of ways. An increasingly common method of user interface is a graphical user interface (GUI), which provides a user with a graphical and intuitive display of information.

The technique universally used in data processing systems to interact with a GUI display is to display a single graphical pointer within the display device, which a user may control with a graphical pointing device, such as a mouse, track ball, or joystick. Utilizing the graphical pointing device, a user may select a point at the position indicated by the graphical pointer by depressing a button associated with the graphical pointing device. The response of the data processing system to the user's selection is determined by the application or operating system software. For example, in some data processing systems, if the point selected is within an object or icon displayed within the display device, the user can relocate the object or icon utilizing the drag-and-drop technique well-known in the art. Conventionally, the motion of the graphical pointer within the GUI display is linearly related to the movement of the graphical pointing device. For example, if a user moves the graphical pointing device 2 units to the right, the graphical pointer responds by moving 2 scaled units to the right within the display.

Word processing programs and other similar applications often provide a cursor in addition to the graphical pointer. Utilizing the graphical pointing device, a user may position the cursor at locations within the display, by clicking on a mouse button. Cursors and other indicia of position are distinguished from graphical pointers in that they do not move in conjunction with the graphical pointer in response to operation of the graphical pointing device.

Although utilizing a graphical pointer provides an intuitive method of user interaction with a GUI display, it is often inefficient, particularly if the display consists of multiple windows, or a single display which is large or complex. For example, if a display includes five separate windows in which a user is manipulating objects, a large portion of the time required to complete a task is spent traversing the display with the graphical pointer. The inefficiency is greatest when the task requires repetitive switching between the different windows.

Consequently, it would be desirable to have an improved method and system for manipulating a plurality of graphical pointers within a display utilizing a single graphical pointing device.

SUMMARY OF THE INVENTION

It is therefore one object of the present invention to provide an improved method and system for data processing.

It is another object of the present invention to provide an improved method and system for user interface to a data processing system.

It is yet another object of the present invention to provide an improved method and system within a data processing system for manipulating a plurality of graphical pointers utilizing a single graphical pointing device.

The foregoing objects are achieved as is now described. An improved method and system for manipulating a plurality of graphical pointers utilizing a single graphical pointing device are disclosed. A plurality of graphical pointers are displayed within a display device. A user may then temporarily select one graphical pointer among the plurality of graphical pointers. During the selection, the selected graphical pointer is manipulated in response to operation of a single graphical pointing device. A point within the display device specified by the position of the selected graphical pointer is selected in response to closure of a switch associated with the selected graphical pointer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
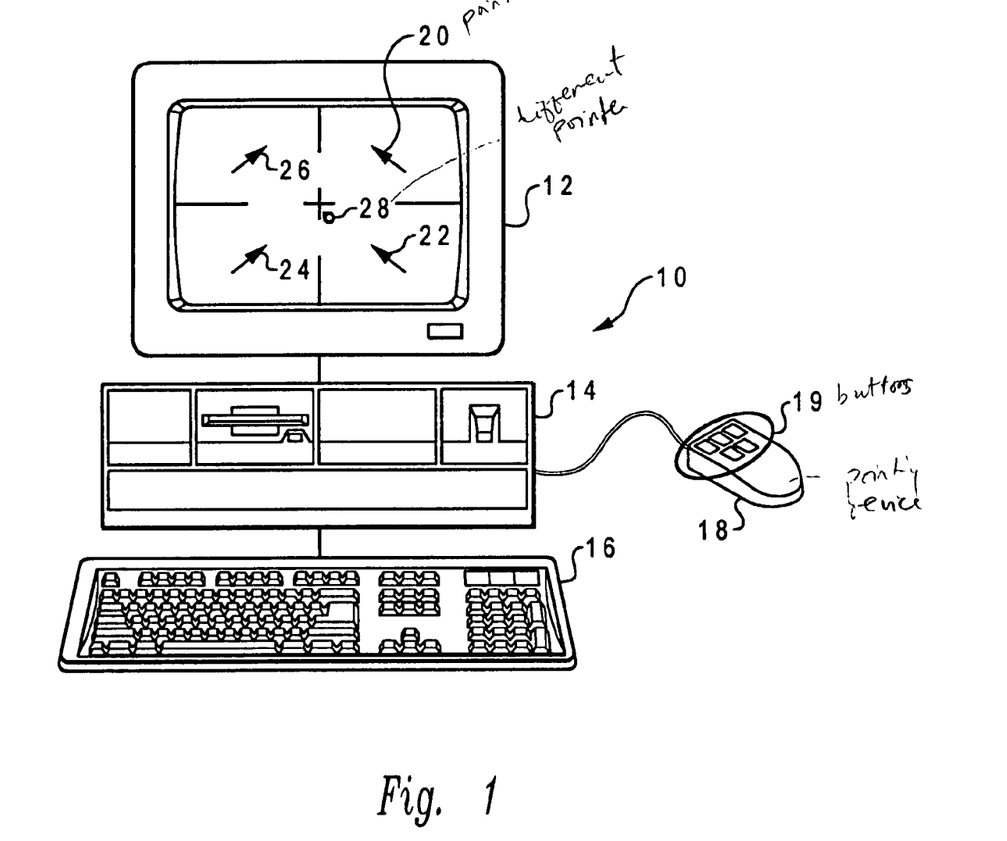
FIG. 1 illustrates a data processing system utilizing the method and system of the present invention.

With reference now to the figures and in particular with reference to FIG. 1, there is illustrated a data processing system implementing the present invention. Data processing system 10 comprises display device 12, processor system 14, keyboard 16, and mouse 18. In a manner well-known in the art, a user inputs data to processor system 14 utilizing keyboard 16. Processor system 14 outputs data to a user via display device 12.

As illustrated, mouse 18 includes five mouse buttons, rather than two, as is common in prior art systems. Each of the five buttons of mouse 18 corresponds to one of graphical pointers 20-28, displayed within display device 12. Utilizing mouse 18, the user may determine the positions of graphical pointers 20-28 within display device 12. A user selects a point within the display by depressing the button among mouse buttons 19 which corresponds to the graphical pointer among graphical pointers 20-28 which is positioned at the selected point.

In the present invention, graphical pointers may be distinguished in a variety of ways. As depicted in FIG. 1, graphical pointers 20-26 are distinguished from graphical pointer 28, which is a small transparent circle. Characteristics distinguishing graphical pointers include the color, size, shape, and direction in which the graphical pointer points.

Figure 2:
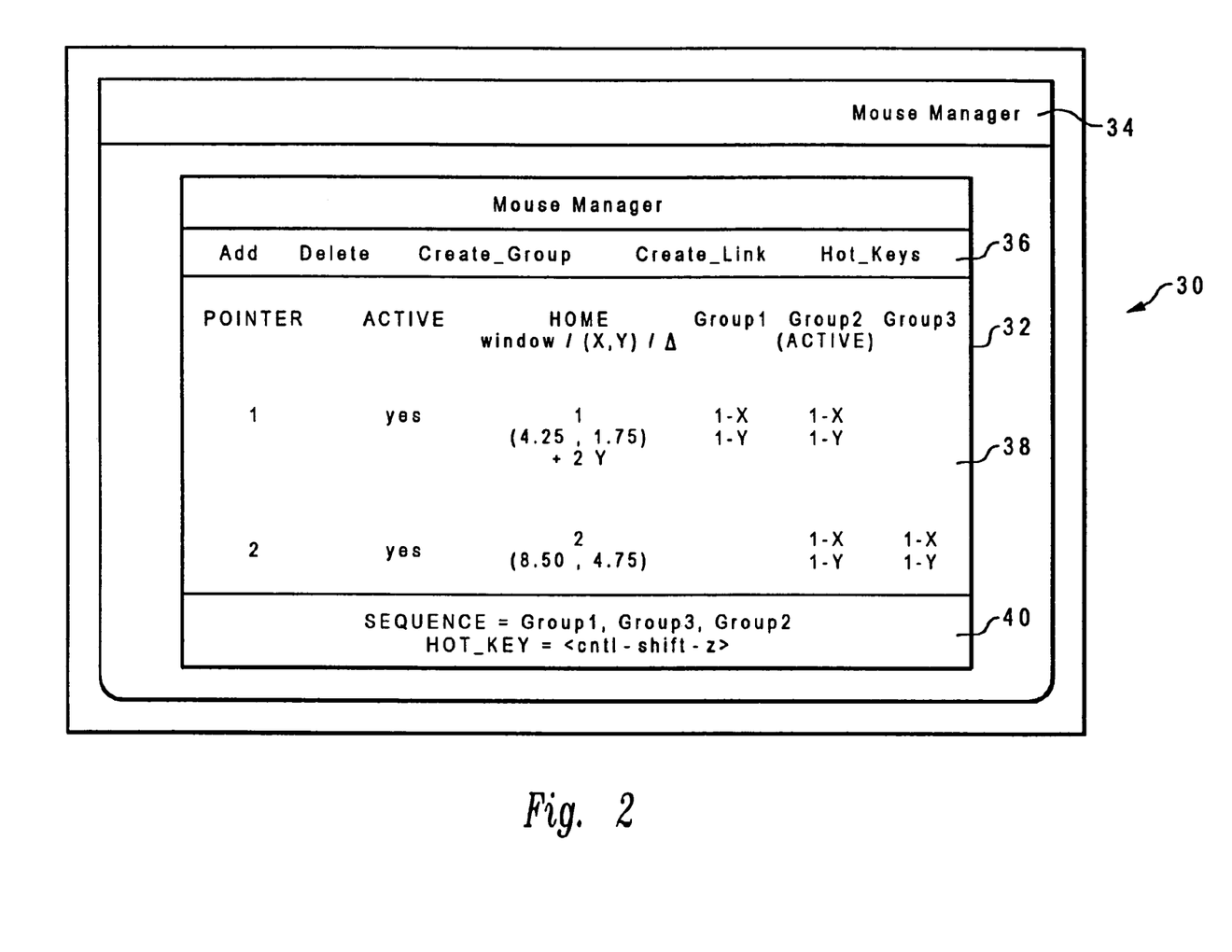
FIG. 2 depicts a window utilized to manage multiple graphical pointers within a data processing system.

Referring now to FIG. 2, there is depicted a window utilized to manage multiple graphical pointers. The creation and management of multiple graphical pointers could occur at three locations within a data processing system. First, and most simply, a fixed number of graphical pointers could be incorporated into the design of the hardware and operating system of the data processing system. Second, graphical pointers could be created and managed utilizing an application program. Third, as illustrated in FIG. 2, multiple graphical pointers could be created and managed by a window manager in windowing software.

As depicted, window 32 is displayed within display 30. A user opens window 32 through invocation of the program "Mouse Manager" by selecting the program title on display menu bar 34. Window 32 includes menu bar 36, pointer status box 38, and sequence box 40.

Figure 3:
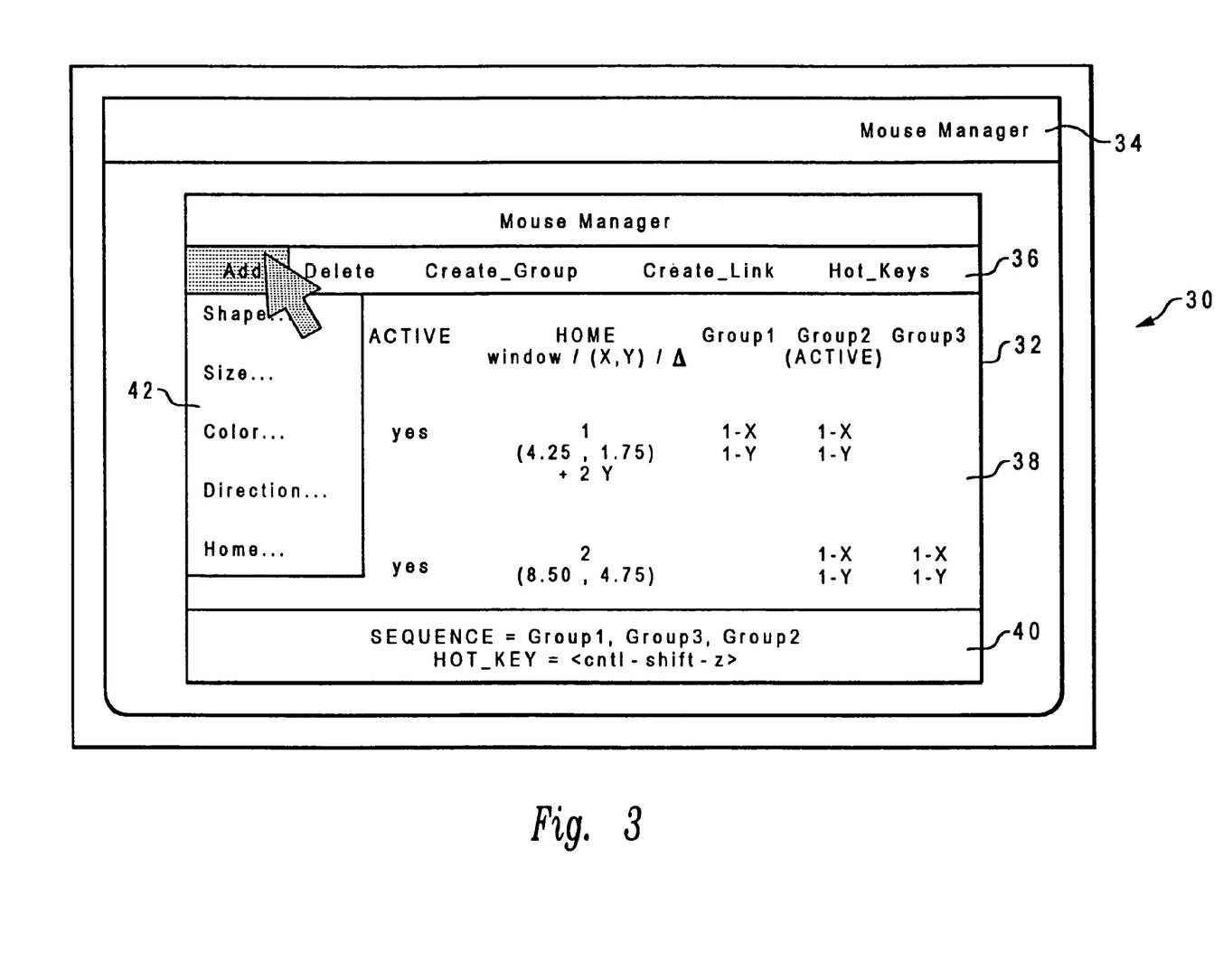
FIG. 3 illustrates the operation of the window depicted in FIG. 2.

Utilizing an active graphical pointer or other input device, such as a speech interpreter or the keyboard, a user may select one of the five menu items displayed within menu bar 36. When a menu item is selected, a pull-down box of functions is displayed beneath the selected menu item. As illustrated in FIG. 3, when a user selects "Add" on menu bar 36, the user is presented with pull-down box 42, containing of options which enable the user to add additional graphical pointers, as well as to select the shape, size, color, and other attributes of the displayed graphical pointers. In addition, pull-down box 42 includes a function which allows the user to define a "Home" window and "Home" position for a given pointer. When a graphical pointer having a home window and home position is activated, the graphical pointer is reset to the specified position in the home window. In general, the home position is specified by the X-Y coordinates of the home position with respect to the upper left-hand corner of the home window. However, in windowing environments supporting three-dimensional displays, the home position is specified by X-Y-Z coordinates.

Within menu bar 36, menu item "Delete" is also provided. Utilizing the functions displayed within the pull-down box associated with "Delete" a user may delete a selected graphical pointer.

Functions associated with the menu item "Create Group" enable a user to select a subset of the multiple graphical pointers which may be manipulated simultaneously by movement of a mouse or other graphical pointing device. These subsets or "Groups" of active pointers may be ordered in a sequence determined by the user. Graphical pointers which are not active are not displayed in order to prevent confusion and the obscuring of displayed objects.

To select an active group among the defined groups, a user presses a hot-key, which the user defines utilizing the pull-down menu associated with the menu item "Hot-Keys". The hot-key may be any combination of keystrokes or other inputs which do not have conflicting definitions in other contexts. When the user presses the hot-key while in an application, the mouse manager program is invoked. At that time, a user may select the next group in the user-defined sequences of groups, which is the default selection, or may select another group in the list. After the user has selected the desired active group, the user presses enter to return to the active application.

A user can also define the relative motions of the graphical pointers utilizing menu item "Create_Link". Selection of Create_Link enables a user to define the motion of a graphical pointer relative to the input from the graphical pointing device utilizing a mathematical function. The function could be a one-dimensional linear relationship or another more complex function.

Within pointer status box 38 information about the multiple graphical pointers is displayed in table format. As illustrated in pointer status box 38, the system currently has two graphical pointers, which are both active, meaning that both move in response to operation of the graphical pointing device.

The third column "HOME" indicates each graphical pointer's home window, home position, and reset/offset. As indicated, graphical pointer 1 has a home position of 4.25 units in the X direction and 2.75 units in the Y direction from the upper left-hand corner of window one. In addition, graphical pointer 1 has reset/offset ($\Delta$) of 2 units in the Y direction, which means that the home position of graphical pointer 1 is advanced 2 units in the Y direction when graphical pointer 1 is reset to its home position by selecting a group in which pointer 1 is active. The remaining three columns of the table displayed within pointer status box 38 indicate that the user has created three groups of graphical pointers. Group1 contains only graphical pointer 1. Similarly, Group3 contains only graphical pointer 2. Group2 includes both graphical pointer 1 and graphical pointer 2. Below the group name, the mathematical relationship governing the motion of each pointer is listed. The equations "$1-x$" and "$1-y$" indicate that the motion of the graphical pointers within the display will directly correspond the movement of the graphical pointing device.

Below pointer status box 38, sequence box 40 is displayed. Sequence box 40 indicates to a user the default sequence in which the groups will be selected, and the currently defined hot-key sequence which the user utilized to invoke the mouse manager window.

Figure 4:
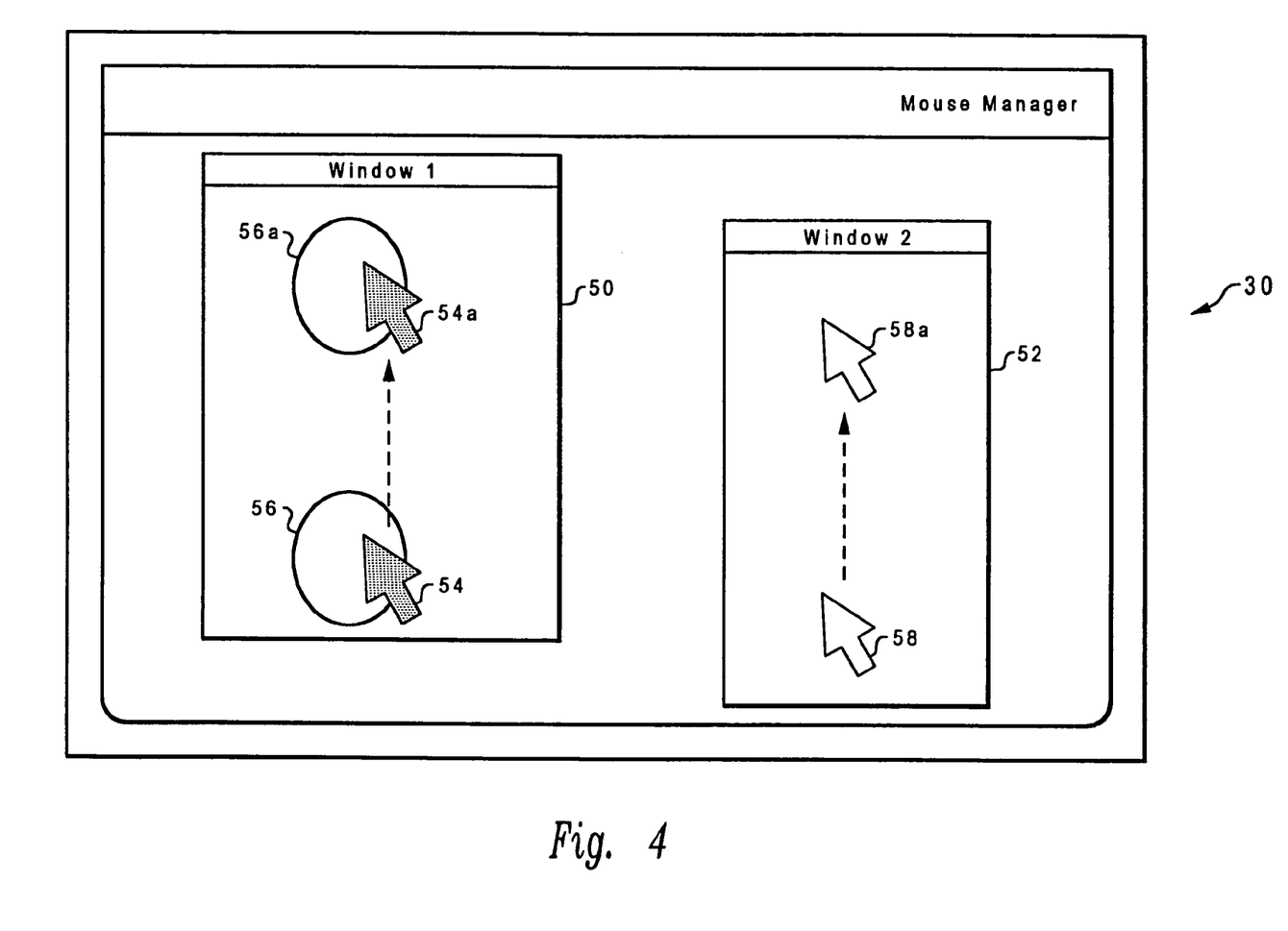
FIG. 4 depicts two graphical pointers moving in a fixed relationship in response to the operation of a graphical pointing device.

With reference now to FIG. 4, there is illustrated a preferred embodiment of the present invention in which two graphical pointers are displayed, with each graphical pointer resident within its own window. Graphical pointers 54 and 58 correspond to graphical pointers 1 and 2, respectively, which were described with reference to FIG. 2. As indicated by the dashed-line arrows, graphical pointers 54 and 58 both move linearly in the Y direction in response to operation of the graphical pointing device to the positions indicated at reference numerals 54a and 58a, respectively. Because a user has selected object 56 utilizing graphical pointer 54, object 56 moves in conjunction with graphical pointer 54 in the familiar drop-and-drag manner.

If the user pressed the hot-key sequence, which was defined as Cntl-Shift-Z, and selected the default group of graphical pointers, graphical pointer 58 would become inactive, since Group1, the subsequent group in the sequence, contains only graphical pointer 1. When graphical pointer 58 again becomes active, the position of graphical pointer 58 will be reset to the home position indicated within pointer status box 38 of FIG. 2. The home position of graphical pointers in two-dimensional displays is determined with respect to the upper left-hand corner of the home window of the graphical pointer, which has coordinates of (0, 0).

Figure 5:
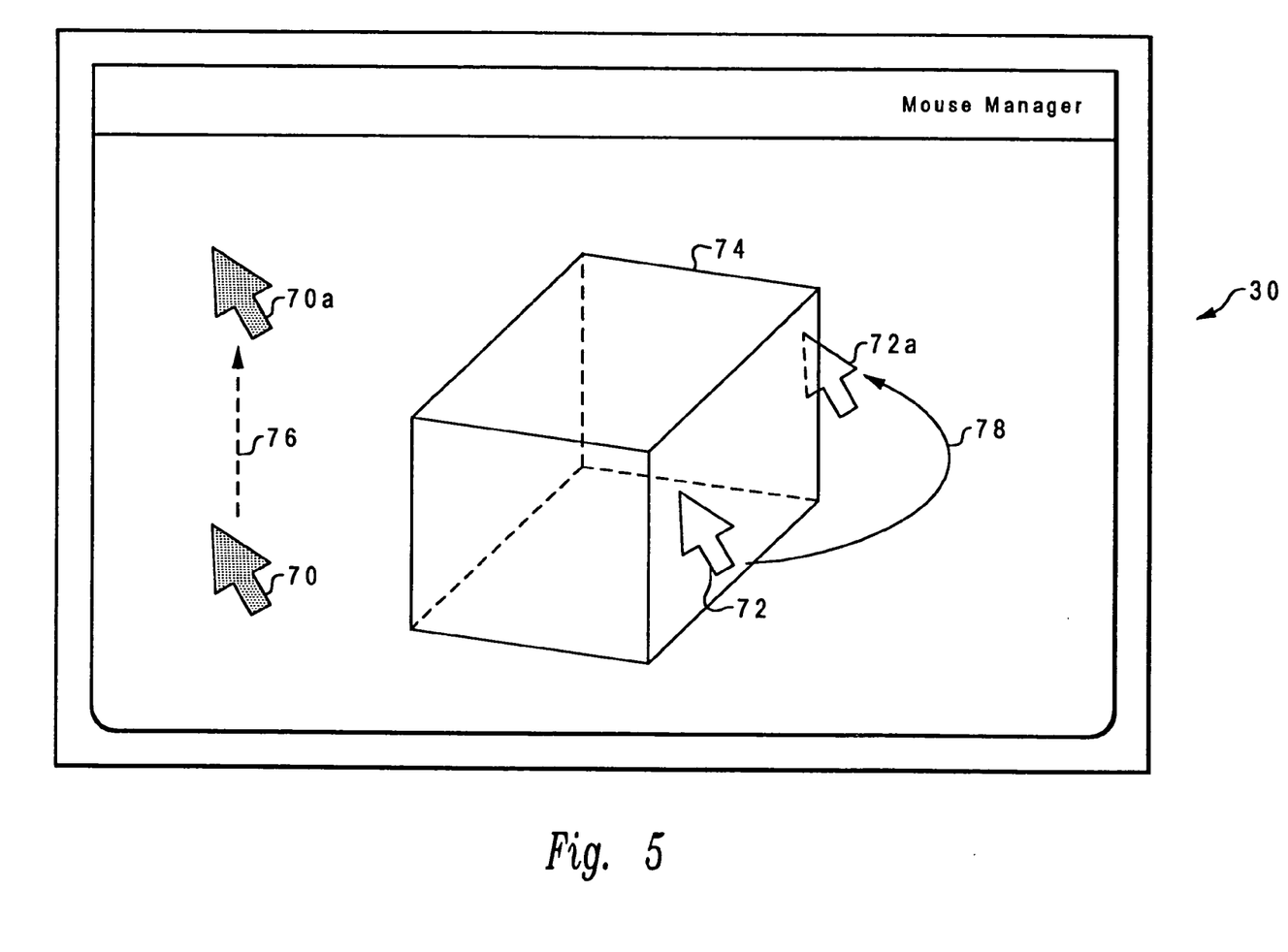
FIG. 5 illustrates a three-dimensional display in which the relative motion of two graphical pointers is governed by a mathematical function.

Referring now to FIG. 5, there is depicted a preferred embodiment of the present invention in which multiple pointers are displayed within a three-dimensional display. Within display 30, graphical pointers 70 and 72 are displayed, in conjunction with cube 74. As indicated by the dashed-line illustration of arrows 76 and 78, graphical pointers 70 and 72 are both active, and move to the positions indicated at reference numerals 70a and 72a in response to operation of a graphical pointing device. However, unlike graphical pointer 70, the movement of graphical pointer 72 is not linearly related to the operation of the graphical pointing device. Instead, its movement is determined by a three-dimensional user-defined mathematical function. Thus, even though the display is only two-dimensional, a three-dimensional coordinate system may be utilized.

Figure 6A:
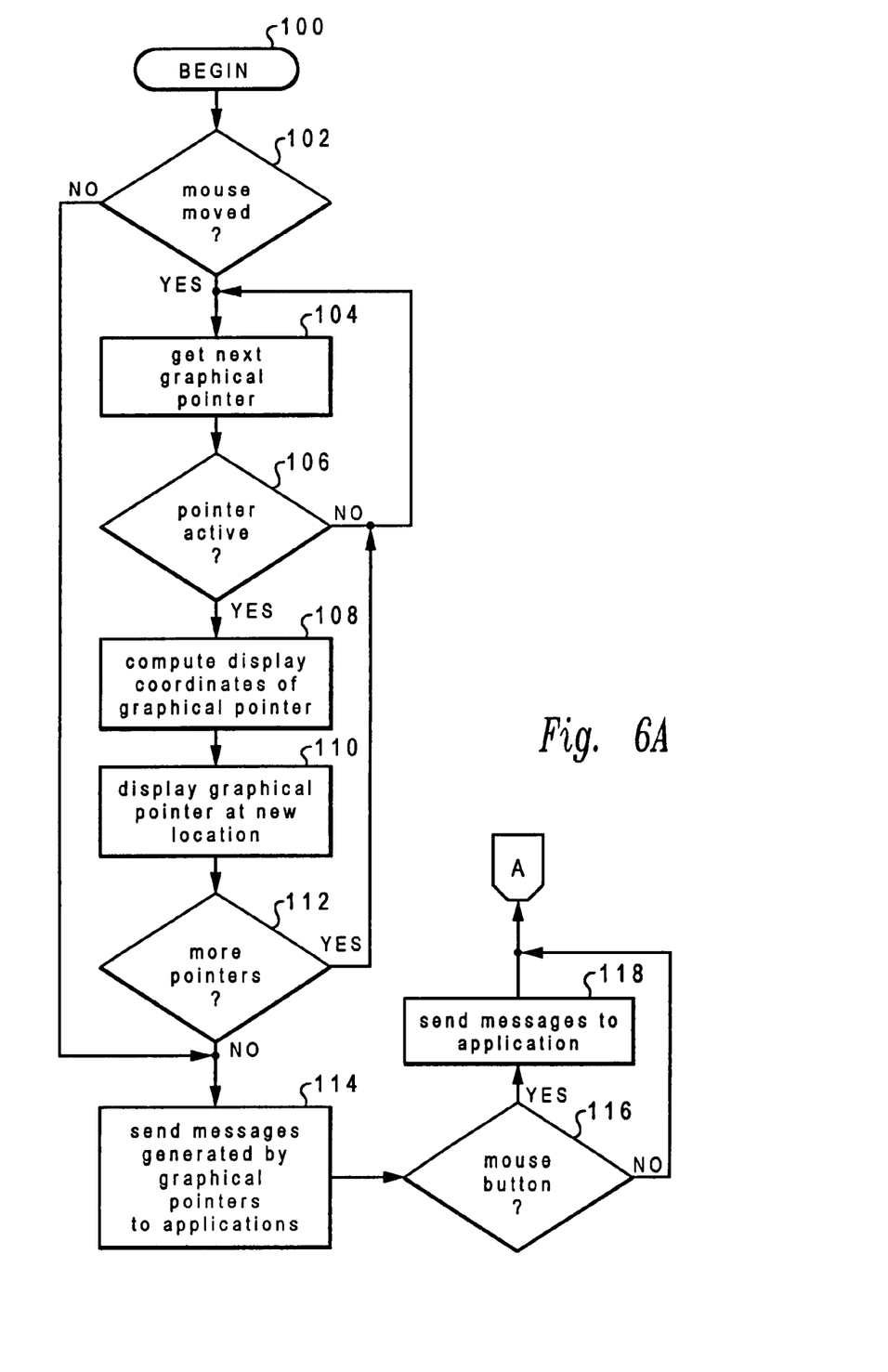
FIGS. 6A and 6B together form a flowchart of the process utilized by a data processing system to manage multiple graphical pointers.
Figure 6B:
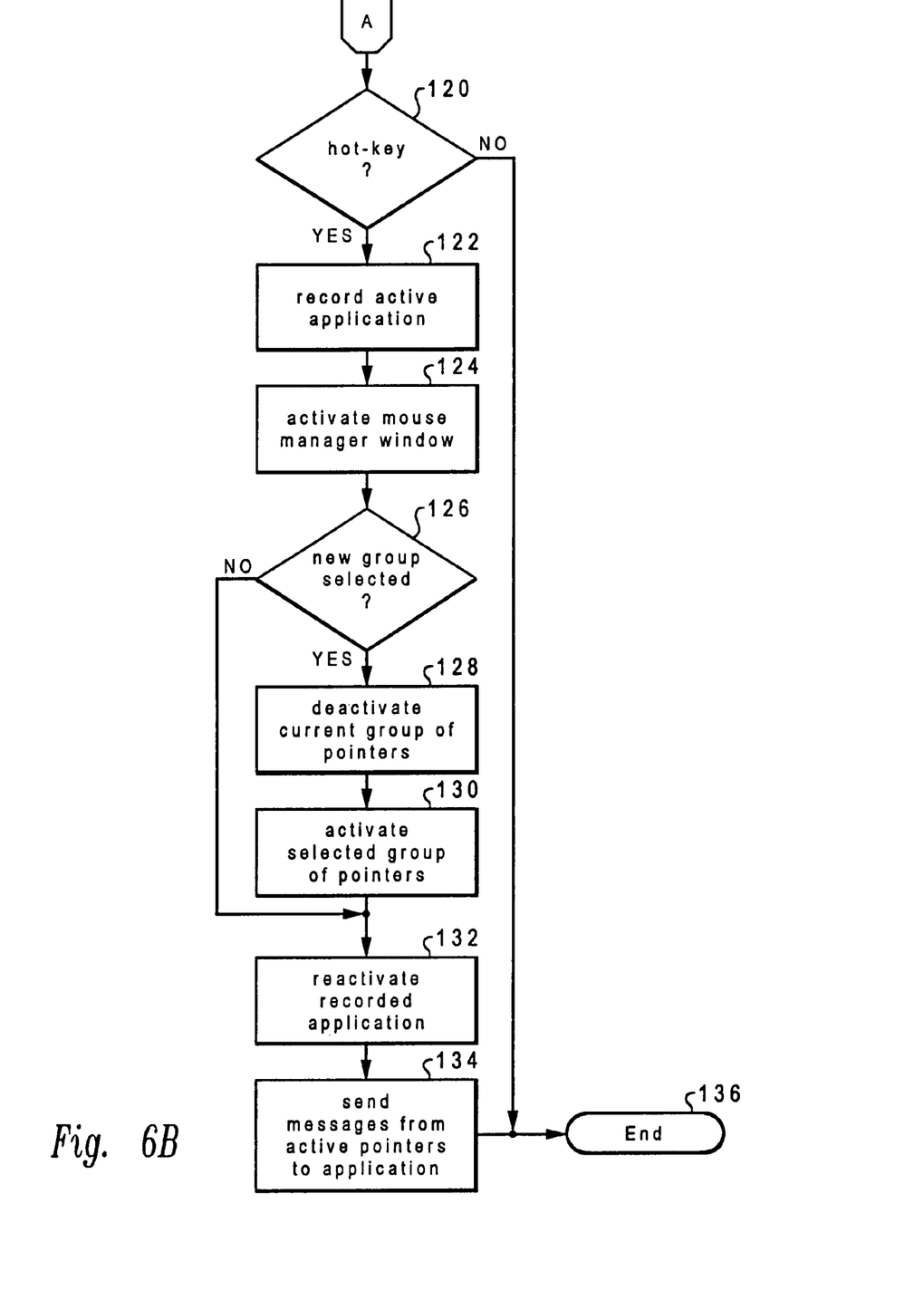

Referring now to FIGS. 6A and 6B, there is depicted a flowchart of the process utilized by the present invention to manage multiple graphical pointers. Because of the wide variety of possible methods to implement multiple graphical pointers and the divergence between window manager programs, processes utilized to manage multiple graphical pointers will vary between data processing systems. The process illustrated in FIGS. 6A and 6B describes a preferred embodiment of the present invention implemented in an X-Windows windowing environment.

In an X-Windows environment, data utilized to display a single graphical pointer is stored within a data structure in memory. To implement multiple graphical pointers according to the present invention, the single data structure is replaced by a plurality of data structures which are maintained in memory by the window manager software utilizing a list of software pointers. The window manager software and active application programs communicate utilizing an asynchronous protocol. Utilizing this protocol, the window manager software sends active application programs messages when graphical pointers generate events relevant to that application. For example, a message is sent to an application program by the window manager software when a user selects an object within the application's window utilizing a graphical pointer.

As illustrated, the process begins in block 100, and thereafter proceeds to block 102, which illustrates the window manager program polling to determine if the user has moved the mouse, or other graphical pointing device interfaced to the data processing system. If the mouse has not moved, the process proceeds to block 114. However, if the mouse has moved, the process proceeds to block 104, which depicts accessing the data structure of the first graphical pointer utilizing a software pointer to the graphical pointer's data structure. Thereafter, the process proceeds to block 106, which illustrates determining if the graphical pointer is currently active. If the graphical pointer is not active, the process returns to block 104, which depicts accessing the data structure of the graphical pointer whose associated software pointer is next in the list of software pointers.

If, however, the graphical pointer is active, the process proceeds from block 106 to block 108, which illustrates computing the coordinates at which to display the graphical pointer. To compute the display coordinates of the graphical pointer, the window manager software applies either a default equation, which is an essentially linear relationship between the mouse and the graphical pointer, or a user-defined equation, which the user determines utilizing the mouse manager software. The process then proceeds to block 110, which illustrates displaying the graphical pointer at the calculated location. Thereafter, the process proceeds to block 112, which illustrates determining if there are more graphical pointers, as indicated by additional software pointers within the list. If more graphical pointers remain to be processed, the process returns from block 112 to block 104. If all active pointers have been repositioned in response to the mouse movement, the process proceeds from block 112 to block 114, which illustrates sending messages generated by the motion of the graphical pointers to the interested applications (i.e., application for which the new locations of the graphical pointers created events).

The process then proceeds to block 116, which depicts determining if a mouse button associated with an active graphical pointer has been pressed. If a mouse button has been pressed, the process proceeds to block 118, which depicts sending a message to the application for which the selection created an event. The process then proceeds from either block 116 or block 118 to block 120.

Block 120 illustrates determining if the hot-key has been pressed. As described above, the hot-key is a user-defined series of keystrokes, which are utilized when selecting a new group of active graphical pointers. If the hot-key has not been pressed, the process proceeds from block 120 to block 136, where it terminates. If the hot-key has been pressed, the process proceeds to block 122, which illustrates recording which application program is currently active. The process then proceeds to block 124, which depicts activating the mouse manager program and displaying the mouse manager window. As described above, the next group of active graphical pointers is set by default to be the group following the currently active group in the user-defined sequence. However, the user may select any of the defined groups utilizing the arrow keys provided on the keyboard or other input device.

Thereafter, the process proceeds to block 126, which depicts determining if a new group of graphical pointers was selected. If a new group was selected, the process proceeds to blocks 128 and 130, which illustrate deactivating the current group of graphical pointers and activating the newly selected group of graphical pointers by building a new list of software pointers to the data structures for the newly selected graphical pointers. This "currently active" list is a subset of the list of all software pointers which point to all of the graphical pointer data structures. As described above, inactive graphical pointers are not displayed within the display device of the data processing system.

Thereafter, the process proceeds to block 132, which illustrates closing the mouse manager window and returning to the active application. The process then proceeds to block 134, which depicts sending messages, for example, the locations of the active graphical pointers, to the active application. Thereafter, the process terminates at block 136.

While the invention has been particularly shown and described with reference to a preferred embodiment, it will be understood by those skilled in the art that various changes in form and detail may be made therein without departing from the spirit and scope of the invention.

I claim:

1. An improved system for selecting within a display device of a data processing system, the system comprising:
   a processor system that causes the display device to simultaneously display a plurality of graphical pointers within a graphical user interface having one or more windows, wherein each of the plurality of graphical pointers is separate from the one or more windows, graphically movable with respect to the one or more windows, and repositionable independently from the one or more windows;
   a graphical pointing device interfaced to said processor system such that a temporarily selected graphical pointer among said plurality of graphical pointers is moved with respect to the one or more windows in response to manipulation of said graphical pointing device during said selection; and
   a switch associated with said selected graphical pointer among said plurality of graphical pointers, wherein closure of said switch selects a graphical object within said graphical user interface graphically underlying a position of said selected graphical pointer within the graphical user interface.

2. The improved system for selecting points within a display device of claim 1, wherein said graphical pointing device is a mouse.

3. The improved system for selecting points within a display device of claim 1, wherein said switch is a mouse button.

4. The improved system for selecting points within a display device of claim 1, wherein said plurality of graphical pointers comprises a plurality of arrows.

5. The improved system of claim 1, wherein the processor system varies a number of the plurality of graphical pointers displayed within the graphical user interface in response to an input.

6. The improved system of claim 1, wherein the processor system causes the temporarily selected graphical pointer to move along a path within the graphical user interface in response to manipulation of the graphical pointing device in accordance with a non-linear relation.

7. The improved system of claim 6, wherein the processor system varies the relation in response to an input.

8. The improved system of claim 1, wherein:
each graphical pointer among the plurality of graphical pointers has a respective default home window among the one or more windows in which that graphical pointer is initially positioned.

9. The improved system of claim 1, wherein:
the switch is one of a plurality of switches each associated with a respective one of the plurality of graphical pointers.

10. The improved system of claim 1, wherein at least two of the plurality of pointers have graphically distinct appearances.

11. A computer program product for use with a data processing system having a graphical pointing device and a display device, said computer program product comprising:
a computer readable storage medium; and
instruction code stored within the computer readable storage medium that is executable by the data processing system to control a plurality of graphical pointers presented in a graphical user interface, wherein said instruction code includes:
instruction code that causes the data processing system to simultaneously display a plurality of graphical pointers within a graphical user interface having one or more windows, wherein each of the plurality of graphical pointers is separate from the one or more windows, graphically movable with respect to the one or more windows, and repositionable independently from the one or more windows
instruction code that causes the data processing system to permit temporary selection of a selected graphical pointer among said plurality of graphical pointers;
instruction code that causes the data processing system to move said selected graphical pointer with respect to the one or more windows in response to manipulation of said graphical pointing device during said selection; and
instruction code that causes the data processing system, responsive to closure of a switch associated with said selected graphical pointer, to select a graphical object within the graphical user interface graphically underlying a position of said selected graphical pointer.

12. The computer program product of claim 11, wherein said instruction code that causes the data processing system to permit temporary selection comprises instruction code for causing the data processing system to permit temporary selection of a subset of said plurality of graphical pointers, said subset including said selected graphical pointer and at least another graphical pointer.

13. The computer program product of claim 12, wherein said instruction code that causes the data processing system to move said selected graphical pointer includes instruction code that causes the data processing system to move all graphical pointers among said subset of said plurality of graphical pointers in response to manipulation of the graphical pointing device.

14. The computer program product of claim 11, wherein said instruction code that causes the data processing system to move said selected graphical pointer comprises instruction code that causes the data processing system to move the selected graphical pointer along a path within the graphical user interface in response to manipulation of the graphical pointing device in accordance with a non-linear relation.

15. The computer program product of claim 11, wherein said instruction code that causes the data processing system to simultaneously display a plurality of graphical pointers varies a number of the plurality of graphical pointers displayed within the graphical user interface in response to an input.

16. A method of selecting a point within a graphical user interface presented in a display device of a data processing system having a graphical pointing device, the method comprising:
simultaneously displaying a plurality of graphical pointers within a graphical user interface having one or more windows, wherein each of the plurality of graphical pointers is separate from the one or more windows, graphically movable with respect to the one or more windows, and repositionable independently from the one or more windows
permitting temporary selection of a selected graphical pointer among said plurality of graphical pointers;
moving said selected graphical pointer with respect to the one or more windows in response to manipulation of said graphical pointing device during said selection; and
in response to closure of a switch associated with said selected graphical pointer, selecting a graphical object within the graphical user interface graphically underlying a position of said selected graphical pointer.

17. The method of claim 16, wherein permitting temporary selection comprises permitting temporary selection of a subset of said plurality of graphical pointers, said subset including said selected graphical pointer and at least another graphical pointer.

18. The method of claim 17, wherein moving said selected graphical pointer includes moving all graphical pointers among said subset of said plurality of graphical pointers in response to manipulation of the graphical pointing device.

19. The method of claim 16, wherein said moving said selected graphical pointer comprises moving the selected graphical pointer along a path within the graphical user interface in response to manipulation of the graphical pointing device in accordance with a non-linear relation.

20. The computer program product of claim 16, and further comprising varying a number of the plurality of graphical pointers displayed within the graphical user interface in response to an input.

* * * * *